May 12, 1964  B. F. JAKOBSSON ETAL  3,132,739
DRIVING MEANS
Filed Dec. 18, 1962  4 Sheets-Sheet 1
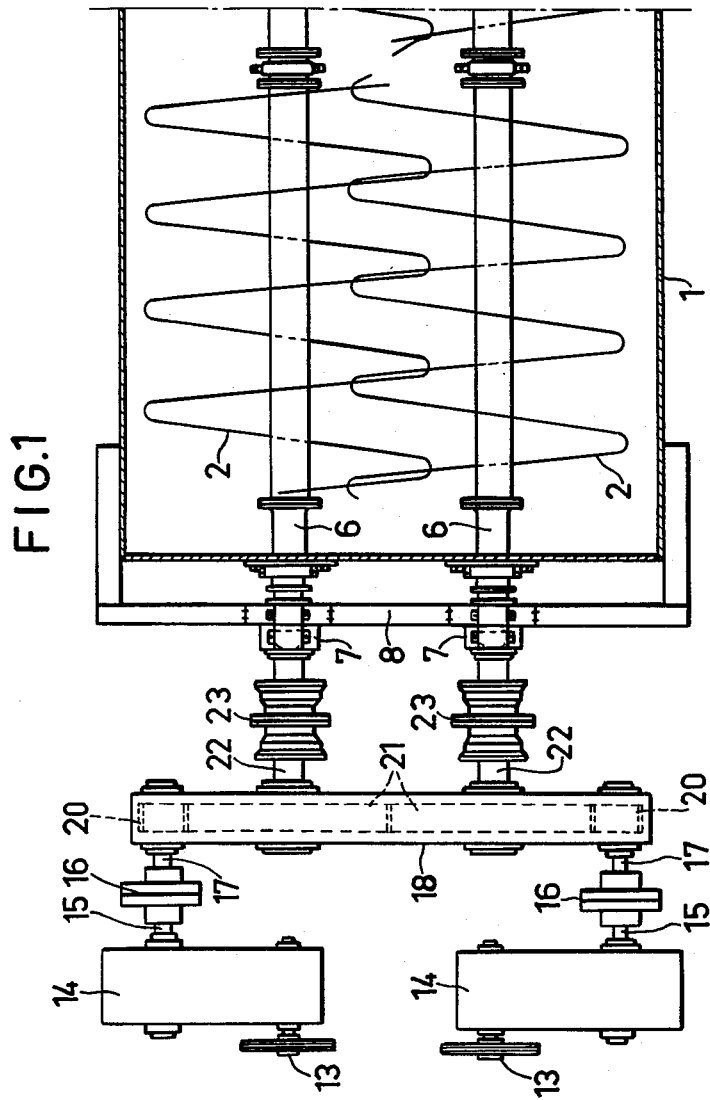
Inventors
Bengt Folke Jakobsson
Erland Viktor Jung
By Cushman, Darby & Cushman
Attorneys

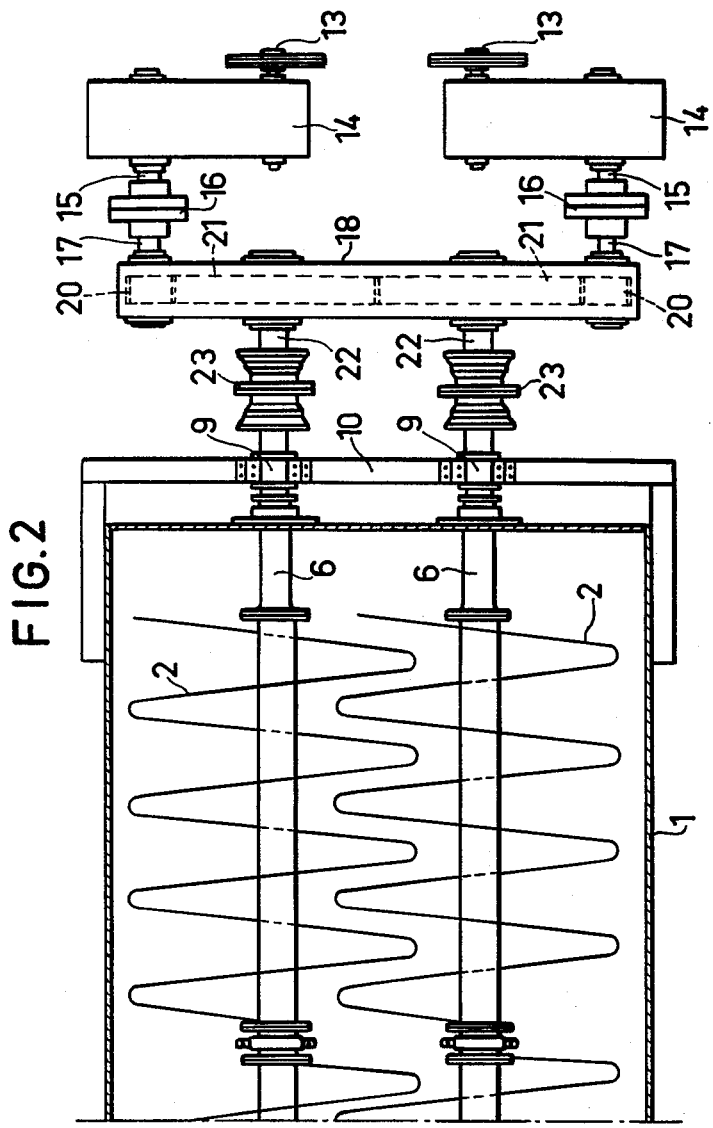

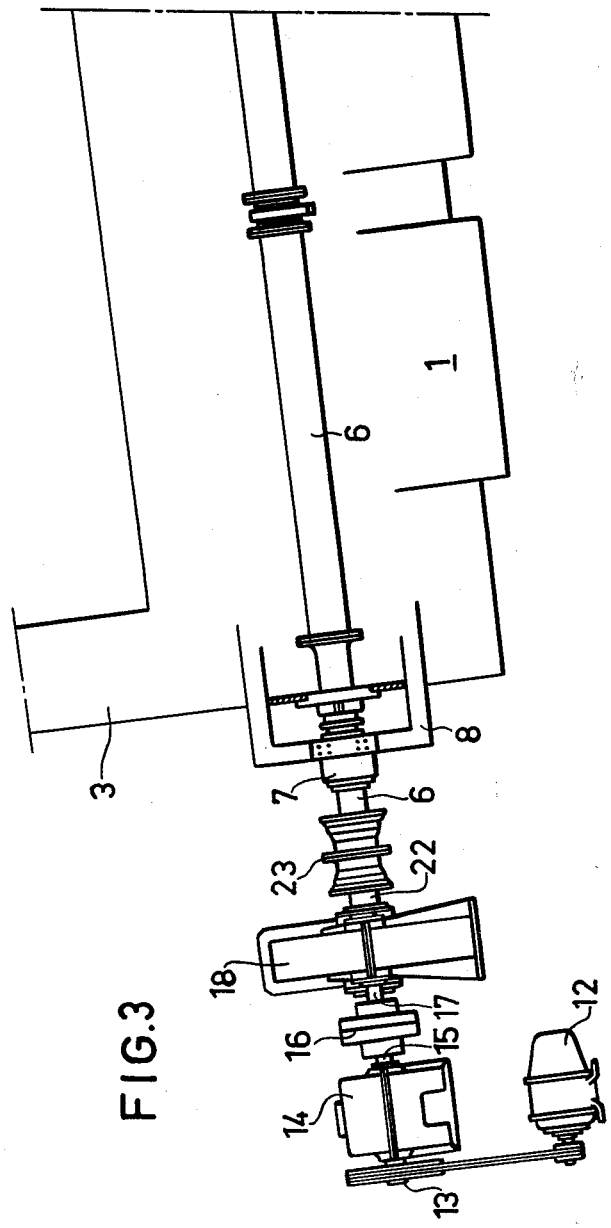

May 12, 1964     B. F. JAKOBSSON ETAL     3,132,739
DRIVING MEANS
Filed Dec. 18, 1962                                   4 Sheets-Sheet 4
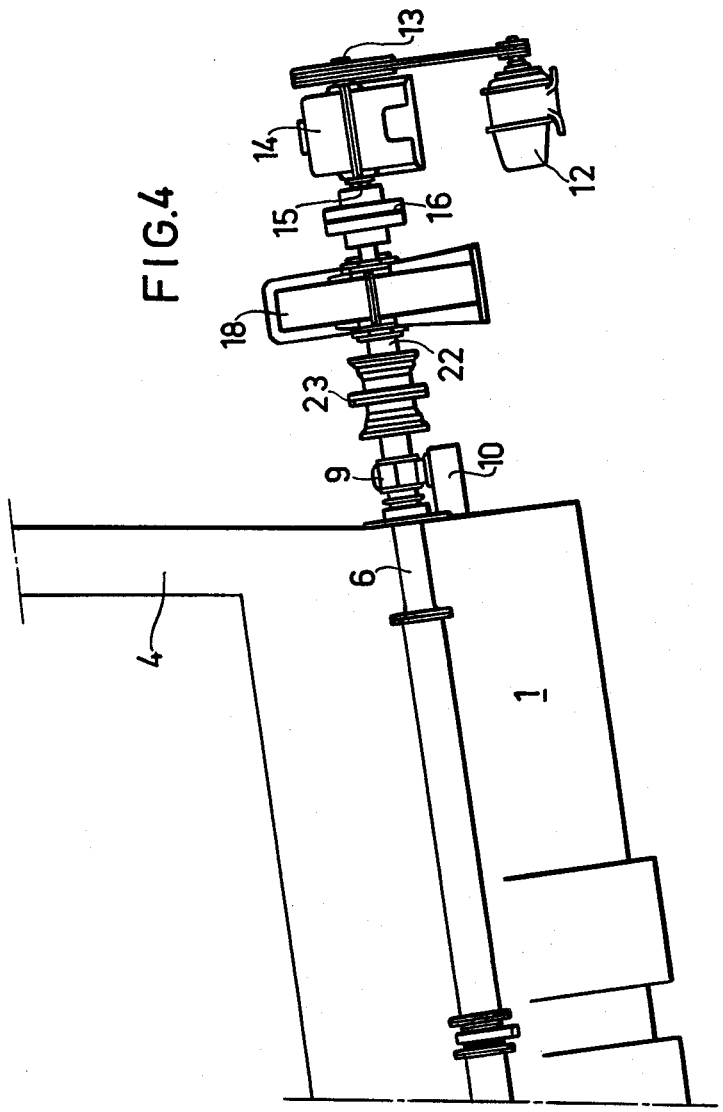

United States Patent Office 3,132,739
Patented May 12, 1964

3,132,739
DRIVING MEANS
Bengt Folke Jakobsson, Goteborg, and Erland Viktor Jung, Landskrona, Sweden, assignors to Aktiebolaget Landsverk, Landskrona, Sweden
Filed Dec. 18, 1962, Ser. No. 245,471
5 Claims. (Cl. 198—213)

This invention relates to driving means for synchronous rotation of at least two interengaging, elongated, rotating members, e.g. a pair of screw conveyors.

Driving devices of this kind are known which comprise two electric motors which are adjusted electrically to supply equal power and accordingly equal moments at varying rotational speed. In doing so one of the driving motors transmits its power to the lower ends of two inclined screw conveyor shafts through a cone belt transmission comprising a common, stationary scored pulley, two multi-stage gear boxes and two chain drives. The second electric motor transmits, for its part, its power to the upper ends of the two screw conveyor shafts through a cone belt transmission comprising two scored pulleys each mounted on a primary shaft of an individual one of two gear boxes and connected to a differential gear, two multi-stage gear boxes and two chain drives.

Measurements carried out have revealed, however, that the amounts of power transmitted through the multi-stage gear boxes might be different. If that power which is transmitted through each gear box from the two electric motors at equal load upon all gear boxes is designated with 100%, the power transmitted by one gear box may vary between 50% and 150% at unequal load upon the screw conveyor shafts. Accordingly a flow of power from one screw conveyor shaft to the other might arise through chain drives, gear boxes and scored pulleys.

The main object of the invention is to prevent such flow of power and to ensure an equal load upon said multi-stage gear boxes.

This and other objects are attained by the driving means according to the invention which is principally characterized therein, that each elongated member is driven by two electric motors, of which one is coupled to one end of its associated member and the other is coupled to the other end of said member; in that the elongated members are mechanically and positively interconnected at their two ends; and in that the motors are, in electrical respect, so adjusted as to supply mutually equal driving moments at the same rotational speed.

In a preferred embodiment the two screw conveyors are interconnected at each end by means of a strongly dimensioned distributing gear box comprising two big, interengaging gear wheels which are each coupled to an individual one of the two screw conveyors, and smaller gears each coupled to one of the big gear wheels and to an individual driving motor.

By this arrangement of the driving means that advantage is attained that a possible flow of power is limited to the distributing gear boxes and those coupling means, which may be interposed between the screw conveyors and these gear boxes, so that the multi-stage gear boxes will not become subjected to unequal loads.

Further objects and advantages of the invention will become more fully apparent from the following description and the accompanying drawings illustrating a preferred embodiment of the invention as applied to diffusion troughs adapted e.g. for the leaching of beet chips in sugar refineries, and in which FIGS. 1 and 2 are plan views, partly in longitudinal section, of the lower and upper ends respectively of a diffusion trough and illustrate in particular the driving means which are positioned at the respective ends and are adapted to rotate the mutually interengaging screw conveyors located in the trough; and FIGS. 3 and 4 are side views corresponding to FIGS. 1 and 2 respectively.

Referring to the drawings, 1 designates an inclined diffusion trough containing two elongated members in the shape of interengaging screw conveyors 2 which are rotated by driving means according to the invention. The screw conveyors which are only diagrammatically illustrated and have to be rotated synchronously in their entire length, transport beet chips which is introduced through an inlet 3 at the lower end of the diffusing trough, therefrom to the upper end of the trough where the leached chips is fed out through an outlet 4 by means of a transporting means (not shown).

The leaching liquid is supplied to the upper end of the trough 1 through inlet tubes (not shown) and flows in counterflow with respect to the beet chips through the trough to the lower end thereof, where the leaching liquid enriched on sugar is led off through outlet tubes (not shown). The shafts 6 of the screw conveyors are at their lower ends journalled in combined axial and radial bearings 7 in a frame-work 8. At their upper ends the shafts 6 are journalled in a radial bearing 9 in a frame-work 10.

Those elements comprised in the driving means according to the invention, which are located at the lower end, comprise two driving motors or prime movers 12 (FIG. 3) which are coupled by means of chain drives or cone belt transmissions to the primary shafts 13 of two multi-stage gear boxes of standard type. The secondary or driven shafts 15 thereof are each by means of an elastic coupling 16 coupled to individual primary shafts 17 of a common, very strongly dimensioned distributing gear box 18. On each primary shaft 17 a small pinion 20 is secured which is in engagement with a larger gear wheel 21. The two larger gear wheels 21 are in engagement with each other and are each secured to individual, outgoing secondary shafts 22. These shafts are each in their turn coupled to the shafts 6 of the conveyor screws 2 by means of individual, very strongly dimensioned universal gear couplings 23, comprising an inner and an outer gear wheel having external and internal teeth of a particular shape respectively which are in permanent engagement with each other along the entire circumference of the wheels.

The elements of the driving device at the upper end of the leaching trough are, with the exception of the bearings, similar to the corresponding elements at the lower end of the trough 1 and have therefore been given the same designations.

The four electric motors 12 are, as stated above, so adjusted on their electrical side, that they supply mutually equal moments at the same rotational speed, and on account hereof the advantage is gained, that the individual multi-stage gear boxes 14 of standard type will not be subjected to unequal loads. Possible flow of power will take place through the strongly dimensioned universal gear couplings 23 and the two large gear wheels 21 in the respective distributing gear boxes 18.

Another advantage of the device according to the invention resides therein that the standard gear boxes 14 can be given a gear or transmission ratio which is comparatively low as compared with previous practice hitherto. On account hereof one and the same oil suitable for all stages in the standard gear boxes may be chosen for the device according to the invention. This is not possible for the gear boxes in the old embodiment.

While the invention has been particularly shown and described with reference to one preferred embodiment thereof, it will be understood by those skilled in the art that various changes in form and details may be made therein without departing from the spirit and scope of the invention. Thus, part of the elements comprised in the driving means may be omitted or replaced by equivalents. Furthermore, the number of elongated members or screw conveyors may be greater than two, e.g. three or four.

What we claim is:

1. In combination with at least two interengaging, elongated, rotatable members, driving means for synchronous rotation thereof comprising two electric motors for driving each member, one of said motors being coupled to one end of its associated member and the other motor being coupled to the opposite end of said member, said motors being so adjusted in electrical respect as to supply mutually equal driving moments at the same rotational speed; and means for positive and mechanical interconnection of said elongated members at each of their two ends.

2. In combination with at least two interengaging, elongated, rotatable members, driving means for synchronous rotation thereof comprising two electric motors for driving each member, one of said motors being coupled to one end of its associated member and the other motor being so adjusted in electrical respect as to supply mutually equal driving moments at the same rotational speed; and two strongly dimensioned distributing gear boxes located at opposite ends of the elongated members and coupled thereto, each distributing gear box containing two big, interengaging gear wheels, which are each coupled to an individual one of the two elongated members, and smaller gears, each coupled to one of the big gear wheels as well as to an individual one of said driving motors.

3. Apparatus as set forth in claim 2, in which each gear is coupled to its associated electric motor by means of an elastic coupling, a multi-stage gear box and a belt transmission.

4. Apparatus as set forth in claim 2, in which each elongated member at each end is coupled to its associated large gear wheel in the distributing gear box by a universal gear coupling.

5. In combination with at least two interengaging screw conveyors, driving means for synchronous rotation thereof comprising two electric motors for driving each screw conveyor, one of said motors being coupled to one end of its associated screw conveyor and the other motor being coupled to the opposite end of said screw conveyor, said motors being so adjusted in electrical respect as to supply mutually equal driving moments at the same rotational speed; two strongly dimensioned distributing gear boxes located at opposite ends of the screw conveyors and coupled thereto, each distributing gear box containing at least two big, interengaging gear wheels, which are each coupled to an individual one of the elongated members, and a plurality of smaller gears, corresponding in number to the number of screw conveyors; and equal plurality of transmissions, each transmission interconnecting one of said gears and its associated driving motor and being comprised of an elastic coupling, a multi-stage gear box and a belt drive; and an equal plurality of universal gear couplings; each connecting an end of a screw conveyor to its associated large gear wheel of one of said distributing gear boxes.

References Cited in the file of this patent
UNITED STATES PATENTS 2,636,284     Napier _____ Apr. 28, 1953
3,064,908     Hjelte _____ Nov. 20, 1962